United States Patent [19]
Hamano

[11] 3,815,341
[45] June 11, 1974

[54] FILTER FOR REMOVING SUCH PARTICLES AND MISCELLANEOUS DIRT AS CONTAINED IN A FLUID

[76] Inventor: Tatsuji Hamano, 10-7, Higashi-Sugano 1 chome, Ichikawa, Chiba Prefecture, Japan

[22] Filed: Sept. 14, 1971

[21] Appl. No.: 180,414

[52] U.S. Cl. ..................... 55/477, 55/486, 55/514, 55/528
[51] Int. Cl. ........................................... B01d 39/14
[58] Field of Search ........................... 55/485–489, 55/527, 528, 477, 514; 210/488–492

[56] References Cited
UNITED STATES PATENTS

| | | | |
|---|---|---|---|
| 741,210 | 10/1903 | Young | 55/477 |
| 3,018,845 | 1/1962 | Powers | 210/499 |
| 3,019,186 | 1/1962 | Powers | 210/499 |
| 3,246,767 | 4/1966 | Pall et al. | 210/506 |

*Primary Examiner*—Bernard Nozick

[57] ABSTRACT

A filter consists of a base member, which is a coarsely woven or knitted fabric or reticulated material, with flocked fibers on the surface, the length of the fibers being between 1.5 and six times the longest diagonal line or the longest distance between the two opposite sides of the meshes. The flocked fibers are fixed at an angle between 30° and 85°. The process of preparation consists of first applying an adhesive onto the base member, in a manner not to fill the meshes, and then applying the flock fibers. The adhesive is preferably applied in sufficient amount to give a layer of 0.3 mm – 0.6mm, with a base cloth which is removed after the fibers have been fixed.

7 Claims, 2 Drawing Figures

FILTER FOR REMOVING SUCH PARTICLES AND MISCELLANEOUS DIRT AS CONTAINED IN A FLUID

The present invention relates to a novel filter to be employed for removing particles and miscellaneous dirt which may be contained in a fluid, and to processes of manufacturing the filter. The filter comprises flock fibers fixed on one end thereof to the surface of a coarsely woven or knitted fabric or a reticulate matter, which constitutes the base member, thus forming a filter layer of the flock fibers on the surface of the meshes.

It has been general practice to use, as a filter for cleaning a fluid, non-woven fabrics which have a fibrous web formed by the process of parallel arrangement, intersecting arrangement or random arrangement. The web is bonded or fusion-welded to a fixed entity by the employment of a resin or the like. These non-woven fabrics are plain fibrous aggregates which exhibit high flexibility and porosity and which are pliable, but exhibit insufficient strength and are subject to elongation. Therefore, when the non-woven fabrics are employed as the material for the filter for cleaning specifically air, the filter is apt to be flattened or otherwise readily deformed under the influence of its pressure at the time when the filter is flushed for reuse.

The non-woven fabric cannot be reused in the case of an air cleaner of the continuous winding type that requires tension. For this reason, it should be covered, prior to its use, on both sides with a reinforcing material, for instance, a porous plate or a metal wire grating. However, the space between the adjoining fibers constituting the fabric is not uniform but is distributed non-uniformly. In the initial stage of use, the resistance of a fluid is comparatively low, but once dust begins to gather on the fibers, the spaces between the fibers are filled sufficiently rapidly, thus increasing the resistance of the fluid. Another difficulty is that the dust gathering in the interior fibers or filling the spaces between adjoining fibers is very difficult to remove.

The object of the present invention resides in providing a novel filter designed to overcome the disadvantages of the filters known in the art made of non-woven fabrics. Another object is to provide processes of manufacture of the novel filters of this invention.

The crux of the present invention resides in a new filter having flock fibers arranged thereon, featuring low fluid resistance, high dust-collecting efficiency and easy cleanability and reusability for a long period of time.

Specifically designed to achieve the purposes set forth above, the filter of the present invention has a flock of synthetic fibers having a length 1.5 times up to 6.0 times the longest diagonal line or diameter of mesh. The flock is arranged with one end of each fiber flocked and fixed on the surface. A coat of adhesive is applied at a controlled angle of 30° up to 85° onto a base of woven or knitted fabric or reticulate matter made of a proper material.

With reference to the drawings, FIGS. 1 and 2 show two embodiments of the filter of the present invention with an omission of a part thereof, respectively.

Figure 1:
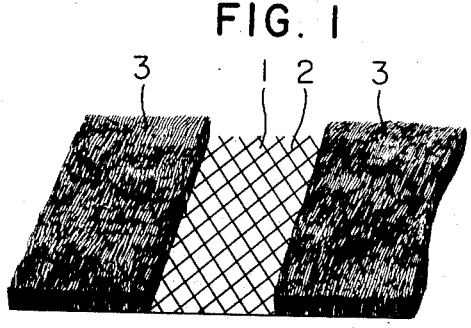
FIG. 1 represents the filter with square meshes.
Figure 2:
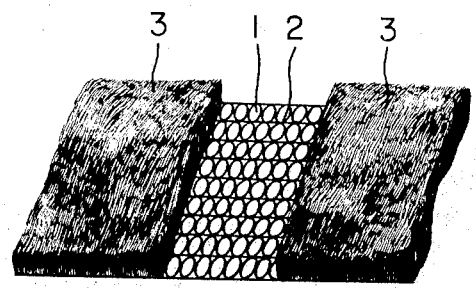
FIG. 2 represents the filter with round meshes.

A coat of adhesive is applied onto the surface of the base member 1 in such a manner as to keep each mesh unfilled and then the flock fibers 2 are arranged and fixed on the base member 1. The base member 1 of either small or large mesh recommended to be used for the filter of the present invention, may be of organic chemical fibers, synthetic fibers, natural fibers, inorganic fibers, or the like processed into a woven or knitted fabric, or a reticulate matter made of molded synthetic resins. The shape of the mesh may be either square or round. A base member having the mesh of uniform size, 8 to 50 meshes per inch, of sufficient tensile strength and proper flexibility is satisfactory. A suitable material for the base member is a Raschel fabric or English knotted net, or a plain weave or the like in the case of woven fabrics. An adhesive suitable for use is one which has excellent adhesion and which undergoes little elongation of its film. For example, the adhesive consists of a mixture such as a solution or a dispersion of a copolymer of acrylonitrile, styrene, alkyl acrylate, polyurethane, a chlorinated polyolefin or other synthetic resin or rubber as a base, to which is added a melamine resin, a phenol resin or a crosslinking agent having isocyanate groups and a suitable catalyst.

One important feature of the present invention is the coating with adhesive in such a manner as to keep each mesh of the base member free from clogging. The recommended process is to apply a coat of adhesive of thickness 0.3mm to 0.6mm onto the base member with a piece of base cloth attached thereto, fix and flock the fibers thereon, and strip the base cloth so attached after thorough drying and curing the coat of the adhesive. It is also possible to apply a coat of adhesive on the base member by spraying, coating or impregnation. The adhesive coat applied on the interstitial sections of the mesh is finally removed by the application of compressed air on the sections. The flock fibers to be flocked and fixed on the base member are recommended to be synthetic fibers as are generally employed for this purpose, for instance, a polyamide, a polyester, a polyacrylate, a polypropylene, or the like, preferably of deniers ranging from 10 through 60. These materials exhibit good elasticity, that is, they return to the original condition as soon as blowing of air is suspended, even when the flock fibers are subjected to strong wind pressure for a long period of time. For forming a porous filter layer, it is imperative that the flock fibers have a length of 1.5 up to 6.0 times the longest diagonal line or diameter of each mesh of the base member. With a base member of 8 to 50 meshes per inch, the length of the flock fiber is recommended to be 2 to 15mm, and flock fibers of such length may well be flocked and fixed by the use of one or several kinds of fibers of the specified length.

Another important feature of the present invention is that the flock fibers thus flocked and fixed should be uniformly oriented in a definite direction against the surface of the base member. The best filtration performance is displayed when the angle thus formed between the flock fibers and the surface of the base member is in the range of 30° through 85°. To state the matter in different words, when the angle is less than 30°, meshes are covered flatly by the flocked members when they are blown by wind pressure, thus resulting in considerable increase in pressure loss. When the angle is greater than 80°, orientation of the flock fibers by wind pressure decreases, thus resulting in considerable decrease in pressure loss, and the dust-collecting efficiency is decreased. Thus in either case, the performance of the filter is considerably reduced and is not satisfactory. For ensuring flocking the flock fibers at the desired angle of 30° through 80°, it is recommended to employ a flocking device in which the electrodes are in parallel arrangement with the base member and at the desired angle of 80° through 30° against the vertical line.

The filter and the processes for manufacturing the same introduced in the present invention serve to overcome the difficult aspects inherent in the conventional processes of manufacturing a filter. Ordinarily, the flock fibers flocked on a reticulated base member do not exhibit sufficient stability and it is virtually impossible or impractical to apply a uniform coat of required and sufficient quantity of adhesive to base member. In accordance with the present invention, an ideal filter with flock fibers uniformly and securely fixed in a definite direction on a base member alone leaving the meshes free from being filled with adhesive, can be made available successfully. After applying a coat of an adhesive onto the base member by spraying, coating or impregnation, the flock fibers are fixed onto the base member, and the adhesive coat is finally removed from the interstitial portion of the base member by blowing compressed air thereon, particularly when the adhesive has been applied by coating or impregnation.

According to a preferred embodiment of the invention, a filter of the most superb quality is manufactured by application of the following process. A cloth made of cotton or the like is overlaid as a base cloth on the back of a reticulate base member, then a coat of adhesive is applied on the surface of the base member, the reticulate base member thus processed is exposed to a high voltage electrostatic field, and flock synthetic fibers, longer than the mesh of the base member, are flocked thereon electrostatically. The base cloth is then stripped off from the base member after thorough drying and curing. In this manner, the flock fibers thus flocked and fixed on the interstitial portions are left on the base cloth together with the adhesive. In this manner, a filter having the desired flock fibers flocked and fixed uniformly and securely on the reticulate portion of the base member can be obtained.

It is essential to employ a proper quantity of a selected adhesive for coating, and to subject the adhesive to thorough drying and curing; to put it otherwise, it is imperative that the film of adhesive exhibit no excessive elongation, that the adhesion be strong enough, and that the quantity of the adhesive for the coating be such that is sufficient to form a coat of 0.3mm to 0.6mm in thickness. In view of the fact that the film of adhesive forms on the interstitial portions, it must be removed from that position together with the flock fibers flocked and fixed thereon at the time of stripping the base cloth for clearing the meshes. For ensuring smooth stripping of the meshes from the base cloth, it is imperative that the cured film of the adhesive have only little elongation to make it feasible for the said film to be broken and to come off along each and every mesh.

It has been found to be undesirable to have an excess of the quantity of the adhesive, since the film of the adhesive formed on the interstitial portions cannot be completely removed together with the base cloth, thus leaving the meshes in an incompletely cleared condition. Likewise, in case the the quantity of the adhesive applied for coating is insufficient, adhesion of the flocked fibers to the base member decreases, but stripping of the adhesive film and clearing of the meshes still may be satisfactorily carried out. Also, when drying and curing of the adhesive is not sufficient, the base cloth is stripped leaving the meshes covered by the film of the adhesive. Therefore, the adhesive must be dried and cured thoroughly to such a degree that the base member, the flocked fibers and the adhesive may be free from deterioration.

It has been found that the desirable conditions of the drying and curing should include preliminary drying at 80°–90°C for 20 – 30 minutes and curing at 100° – 140°C for 20 – 30 minutes. The filter of such a construction as described hereinabove has flock synthetic fibers flocked on the base member at a definite angle and in a definite direction, and constitutes a filtering layer, which is three-dimensional in construction, with each space between adjoining flocked fibers distributed comparatively uniformly at the angle and direction set forth hereinabove. This filter exhibits little pressure loss.

The flocked fibers cover the surface of the meshes three-dimensionally, and form a filtering layer. Dust, therefore, mostly collects on the upper portion of the flocked fibers. However, the flocked fibers are curved starting from the tip thereof by the wind pressure applied on the surface of the filter, with the bonding portion selected as the fulcrum thereof, thus constituting an appropriate cover over the meshes. In this manner, the dust is completely collected, and the dust-collecting efficiency is greatly improved. Also electrostatic electricity generated on the flock fibers by friction between the flocked fibers and air flow causes even extremely fine dusts to be adsorbed, thus improving the dust-collecting efficiency of the filter.

Another feature of the filter of the present invention lies in the fact that the flocked fibers have definite direction, thus making possible for the dust which is collected on the filter to be completely and readily removed by simple brushing, or with suction, in the direction of the lie of the fibers, thus recovering the original performance for reuse. Also the flocked fibers can stand upright with the bonded portion selected as the fulcrum, in case air is blown therethrough from the back of the filter. In this manner, the pressure loss after removing the dust by application of wind pressure returns to the original level of efficiency of a new filter. Having such performance, this filter can be used effectively and efficiently for a long period of time by repeating the cleaning process set forth above; furthermore, this filter proves to be especially effective and efficient under such a condition of use as requires sufficient tensile strength, since it has the strength of five to 10 times as much that of the non-woven fabric.

The filter introduced in the present invention also displays its superb performance in removing the dirt from a liquid by proper selection of the base member, flock fibers and the adhesive since it has such a superb performance as set forth above for air cleaning and purification. In the following examples, which are illustrative of the present invention, the parts are by weight unless otherwise specially indicated.

EXAMPLE I

A Rascel knitted fabric of 30 meshes per inch composed of polyester fibers is overlaid on a base cloth made of cotton fibers. Then the adhesive of such composition as set forth below is applied to a thickness of 0.3mm onto the said overlaid knitted fabric. The adhesive employed consists of 100 parts of polyacrylate, 30 parts of calcium carbonate and 12 parts of isocyanate dissolved in 400 parts of methylethyl ketone. Than a voltage of 30,000 volts is applied on the said overlaid knit fabric in an electrostatic field to flock and fix flock fibers of polyamide, 30 deniers, 10mm and 5mm in length of fiber (1:1 in weight ratio), in such a manner that the angle formed between the said flock fibers and the surface coated with the adhesive is 50° up to 70°, and it is dried at 90°C for the period of 30 minutes, and then cured at 130°C for 20 minutes. A desired filter is then obtained by stripping the base cloth off the Rascel knitted fabric with the flock fibers flocked and fixed thereon. This filter loses pressure by approximately 2mm aq. less than conventional filters. It is superior in dust-collecting efficiency by approximately 5% to a filter made of non-woven fabric of 500g/m², and is very suitable for cleaning and maintenance thereof.

EXAMPLE II

An English knotted net of 25 meshes per inch composed of polyamide fibers is overlaid on a base cloth made of cotton fibers. Then the adhesive of the same composition as set forth in Example I above is applied to the same thickness as set forth in Example I onto the said overlaid knotted net. Flock fibers of polyamide, 25 deniers, 5mm and 3mm in length mixed at the rate of 1:1 by weight in an electrostatic field of 25,000 volts are flocked and fixed at the angle of 35° up to 50° against the surface coated with the adhesive, then it is cured at 120°C for the period of 30 minutes after preliminary drying at 90°C for 30 minutes. A desired filter is then obtained by stripping the base cloth off the English knotted net with the flock fibers of polyamide flocked and fixed thereon. This filter loses pressure by approximately 1mm aq. less than conventional filters and is superior in dust-collecting efficiency by approximately 7% to a filter made of non-woven fabric of 350g/m².

EXAMPLE III

A Raschel knitted fabric of 40 meshes per inch, composed of polypropylene fibers, is overlaid on a base cloth made of cotton fibers. Then an adhesive as set forth hereinbelow is applied to a thickness of 0.4mm onto the said overlaid knitted fabric. The adhesive employed consists of a mixture of 100 parts of chlorinated polypropylene in a toluene solution and 8 parts of isocyanate. Then flock fibers of polypropylene, 18 deniers, 6mm and 4mm in length, mixed at the rate of 1:1 in proportion by weight in an electrostatic field of 12,000 volts, are flocked and fixed on the surface coated with the adhesive at the angle of 70° up to 85° against the said surface coated with the adhesive, then it is cured at 100°C for the period of 20 minutes after preliminary drying at 80°C for 30 minutes. A desired filter is then obtained by stripping the base cloth from the Raschel knitted fabric having the flock fibers of polypropylene flocked and fixed thereon. This filter exhibits lower pressure loss than conventional filters and is superb in dust-collecting efficiency. Especially the polypropylene fibers have high electrostatic resistance and are strongly negatively charged by air friction. Therefore, this filter proves to be especially effective when it is employed as a filter of dust collector.

EXAMPLE IV

A plain weave fabric of 50 meshes per inch, composed of cotton fibers is overlaid on a release paper. Then an adhesive as set forth hereinbelow is applied to a thickness of 0.4mm onto the said overlaid plain weave fabric. The adhesive employed consists of 100 parts of a mixed solution of nitryl rubber and phenol resin, 80 parts of calcium carbonate, 200 parts of trichlorethylene and 200 parts of methylethyl ketone. Then flock fibers of polyester, 14 deniers, 5mm in length are flocked and fixed on the surface coated with the adhesive at the angle of 50° up to 70° against the surface. Then it is cured at 130°C for 20 minutes after preliminary drying at 80°C for 30 minutes. A desired filter is then obtained by stripping the release paper from the plain weave fabric having the polyester fibers flocked and fixed thereon. This filter exhibits only a slight pressure loss, i.e., b approximately 20mm aq. in the case of wind velocity of 2m/sec., and by approximately 40 aq. in the case of the wind velocity of 3m/sec.; furthermore, the filter proves to be superb in its dust-collecting efficiency, thus being especially suitable for use as a bag filter.

What we claim is:

1. A filter for cleaning fluids which comprises a base member having a meshed structure, a flock of fibers of length between 1.5 and six times the longest distance between two opposite sides of the meshes, the size of the meshing being 8–50 meshes per inch, said fibers being uniformly fixed on one face of the opening of said base member, all of said fibers being at an angle 30° – 85° with respect to said base member, and an adhesive between said base member and said flocked fibers, said fibers forming a three - dimensional coating upon the surface of said base member.

2. The filter according to claim 1 wherein the meshes are round.

3. The filter according to claim 1 wherein the meshes are square.

4. The filter according to claim 1 wherein the adhesive layer is of thickness between 0.3mm and 0.6mm.

5. The filter according to claim 1 wherein the base member is made of a material which is organic fibers, inorganic fibers, synthetic fibers, natural fibers, or molded synthetic resins.

6. The filter according to claim 5 wherein the flock fibers are fibers of a polyamide, a polyester, a polyacrylate, or a polypropylene, of deniers between 10 and 60.

7. The filter according to claim 6 wherein flock fibers of at least two materials are used.

* * * * *